United States Patent [15] 3,689,853

Badger et al. [45] Sept. 5, 1972

[54] SIX POSITION MEMORY TYPE UHF TUNER

[72] Inventors: Joe G. Badger; Alarico A. Valdettaro, both of Bloomington, Ind.

[73] Assignee: Sarkes Tarzian, Inc., Bloomington, Ind.

[22] Filed: Aug. 17, 1971

[21] Appl. No.: 172,552

Related U.S. Application Data

[63] Continuation of Ser. No. 856,277, Sept. 9, 1969, abandoned.

[52] U.S. Cl.....................334/55, 74/10.41, 74/10.6, 74/10.8, 74/33, 317/253, 334/45, 334/84, 334/87, 334/88

[51] Int. Cl...............................................H03j 5/06

[58] Field of Search...........74/10, 10.45, 10.5, 10.54, 74/10.6, 10.8, 10.85, 10.41; 334/7, 8, 21, 47, 45, 48, 50, 51, 58, 55, 81, 83, 84, 87, 88; 317/253

[56] References Cited

UNITED STATES PATENTS

| | | | |
|---|---|---|---|
| 2,633,544 | 3/1953 | Herr | 58/140 UX |
| 3,080,703 | 3/1963 | Body | 58/140 |
| 3,466,549 | 9/1969 | Milnes | 74/10.6 X |
| 3,474,362 | 10/1969 | Harten | 334/51 |
| 3,483,693 | 12/1969 | Smythe, Jr. | 58/140 |
| 3,513,418 | 5/1970 | Schwartz | 74/10.45 |

*Primary Examiner*—Paul L. Gensler
*Attorney*—Richard D. Mason et al.

[57] ABSTRACT

The rotor shaft of a UHF tuner is spring biased by means of a torsion wire which extends longitudinally along the axis of the rotor shaft so that as the rotor shaft is rotated the wire is twisted. A rotatable memory turret is interconnected with the UHF tuner rotor shaft to provide UHF channel selection in any one of six positions of a main selector shaft. Indicator lights are selectively energized by means of a switching arrangement connected to the main selector shaft and a sensitive dial pointer arrangement is provided so that the operator may correlate a particular position of the main selector shaft with the particular UHF station which is being received. An AFC defeat switch is actuated each time the main selector shaft is moved to a different UHF channel position and is closed at all times when the main selector shaft is moved rearwardly for adjustment of the UHF rotor shaft to a new memory position.

24 Claims, 15 Drawing Figures

INVENTORS:
JOE G. BADGER
ALARICO A. VALDETTARO
BY Mason, Kolehmainen, Rathburn & Wyss
ATTORNEYS INVENTORS
JOE G. BADGER
ALARICO A. VALDETTARO
BY Mason, Kolehmainen, Rathburn & Wyss
ATTORNEYS INVENTORS:
JOE G. BADGER
ALARICO A. VALDETTARO
BY Mason, Kolehmainen, Rathburn & Wyss
ATTORNEYS

SIX POSITION MEMORY TYPE UHF TUNER

This application is a continuation of copending application Ser. No. 856,277 filed Sept. 9, 1969 and is assigned to the same assignee.

The present invention relates to UHF tuners capable of receiving any one of the seventy UHF television stations, and, more particularly, to a six position memory type UHF tuner in which any one of the seventy UHF television stations may be automatically tuned in response to rotation of a UHF station selector shaft to any one of six detented positions.

In conventional UHF tuners a number of capacitative tuning plates are carried on a common rotor shaft, different pairs of plates being associated with the RF, oscillator and mixer portions of the UHF tuner. Memory type tuning mechanisms have been heretofore provided for adjusting the rotor shaft of such a UHF tuner to a position corresponding to any station in the UHF band, in response to rotation of an input selector shaft to any one of a number of detented UHF positions. However, these arrangements have in general been heavy, bulky and expensive mechanisms which are unsuitable for low cost mass production in high quantities. Also, the rotor shaft mounting arrangement employed in such memory type UHF tuners has had a relatively high degree of friction which interferes with the accurate setting as well as the resettability of the rotor shaft to a precise tuning position.

As a result, a memory type UHF tuner capable of automatically selecting any one of a predetermined number of UHF stations anywhere within the entire UHF band has not been able to supplant, to any large extent, the more conventional continuous drive mechanisms for UHF tuners. Also, such prior art memory type UHF tuners as are available have required a dial indicator arrangement for indicating the position of the rotor shaft in each position of the selector shaft which is quite complicated and expensive and adds to the overall cost of the memory type UHF tuner. These memory type UHF tuners also conventionally make no provision for automatically defeating the automatic frequency control circuit of the associated receiver when the "memorized" UHF channel is changed by adjusting the tuning mechanism throughout the UHF band to select a new UHF channel. As a result, the tuning, which is continuous over the UHF band, will be inhibited by the AFC control signal, since the tuner will tend to lock onto any received signal whether it is the desired UHF channel signal or not. Furthermore, such prior art memory type UHF tuners have required the use of separate selector knobs for manual selection of a "memorized" UHF station and the adjustment of the memory tuning mechanism to a different UHF channel.

It is, therefore, an object of the present invention to provide a new and improved memory type UHF tuner which eliminates one or more of the disadvantages of the prior art arrangements discussed above.

It is another object of the present invention to provide a new and improved memory type UHF tuner in which an extremely low friction rotor shaft mounting arrangement is employed so that the rotor shaft may be adjusted to any channel within the UHF band by means of a tuning mechanism which can be reset to the memorized channel to a high degree of accuracy.

It is still another object of the present invention to provide a new and improved memory type UHF tuner wherein the rotor shaft of the UHF tuner is spring biased by a torsion wire spring arrangement which is located along the longitudinal axis of the rotor shaft and does not interfere with the electrical characteristics of the UHF tuner.

It is a further object of the present invention to provide a new and improved memory type UHF tuner which is inexpensive, lightweight and is suitable for mass production in high quantities while meeting exacting specifications as to resettability or repeatability when the UHF channel selector shaft is moved away from and returned to a given channel position.

It is a still further object of the present invention to provide a new and improved memory type UHF tuner wherein a switching circuit suitable for defeating the AFC circuit of the associated television receiver, is closed during periods when the UHF rotor shaft is moved from one memorized position to another.

It is a further object of the present invention to provide a new and improved memory type UHF tuner wherein a suitable switching arrangement is provided for defeating the AFC circuit of the associated television receiver during periods when a different UHF channel is being "memorized" by adjustment of the rotor shaft of the UHF tuner.

It is another object of the present invention to provide a new and improved memory type UHF tuner wherein a single selector knob may be employed to select any one of six memorized UHF channels and this same selector knob may be depressed and rotated for adjustment of the tuning mechanism to select a new UHF channel which is to be memorized.

Briefly, in accordance with one aspect of the invention, the rotor shaft of the UHF tuner is spring biased by means of a torsion wire which extends longitudinally along the axis of the rotor shaft so that as the rotor shaft is rotated this wire is twisted. A pinion gear mounted on the rotor shaft is positioned in engagement with rack teeth carried on a transversely extending driveshaft which may be selectively adjusted to any channel in the UHF band by means of a cam follower and adjustable turret arrangement. Different adjustment pins on the rotatable memory turret may be selectively moved into engagement with the cam follower element to provide UHF channel selection in any one of six positions of the main selector shaft of the tuning mechanism. A series of six indicator lights are provided which are selectively energized by means of a switching arrangement connected to the main selector shaft of the mechanism. Also, a sensitive dial pointer arrangement is provided in engagement with the rack driveshaft and arranged to cooperate with a fixed indicator scale so that the operator may correlate a particular position of the main selector shaft with the particular UHF station which is being received.

An AFC defeat switch is actuated each time the main selector shaft is moved to a different UHF channel position of the memory turret. Furthermore, this AFC defeat switch is closed at all times when the main selector shaft is moved rearwardly for adjustment of the UHF rotor shaft to a new memory position. Accordingly, a single selector knob may be connected to the main selector shaft and is employed for both manual selection of memorized UHF channels, by rotation of the knob, and also re-adjustment of the memory tuning mechanism to any new UHF channel within the entire UHF band by depressing and rotating the knob.

The invention, both as to its organization and method of operation, together with further objects and advantages thereof, will best be understood by reference to the following specification taken in connection with the accompanying drawings in which.

Figures 1, 2, 7:
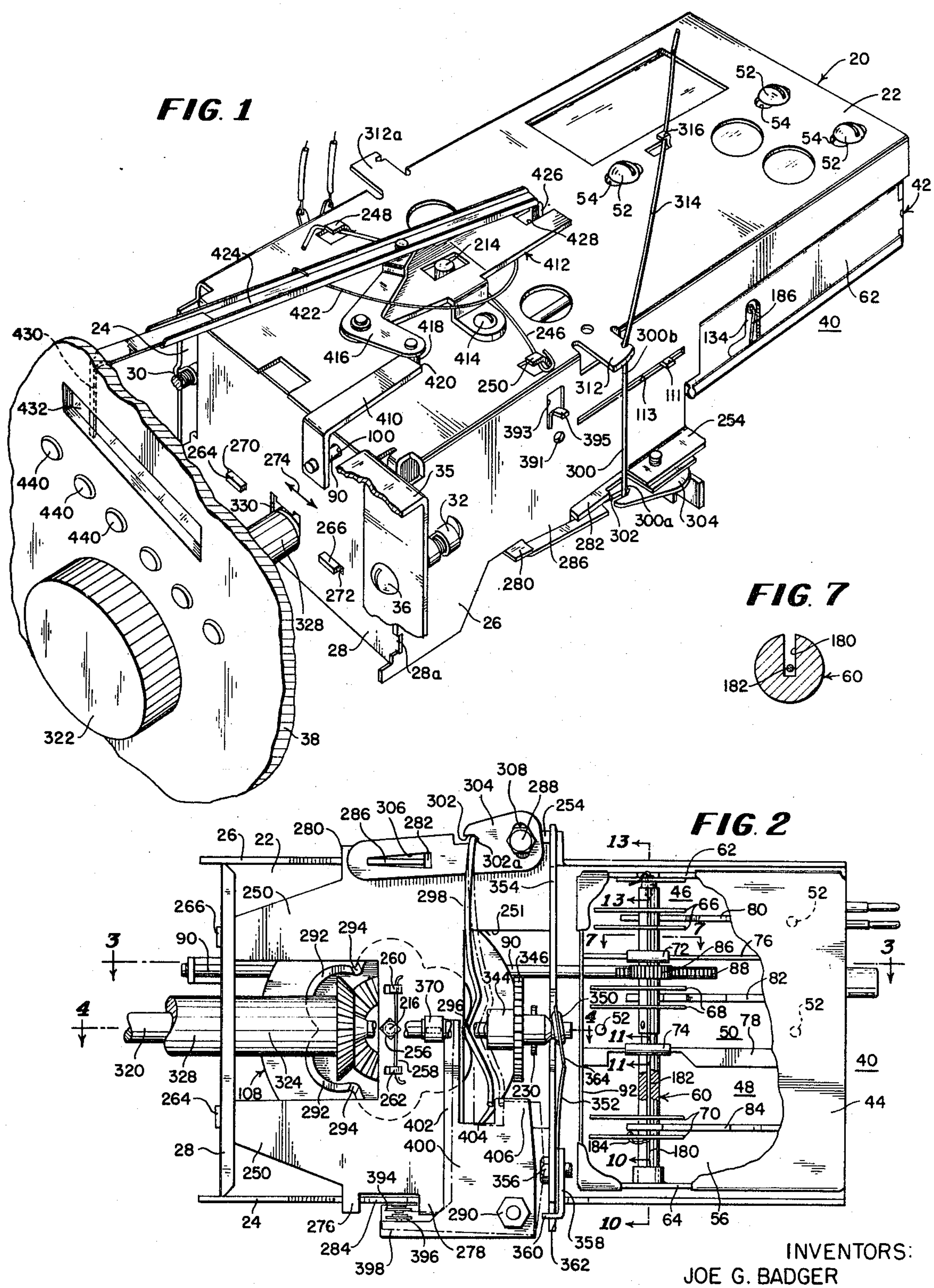
FIG. 1 is a perspective view of a full range memory type UHF tuner arrangement embodying features of the present invention.
FIG. 2 is a bottom view of the tuner arrangement of FIG. 1.
FIG. 7 is a sectional view taken along the line 7—7 of FIG. 2.

Referring now to the drawings, the full range memory type UHF tuning mechanism of the present invention is therein illustrated as comprising a main housing member indicated generally at 20, which is provided with a top wall 22, a left-hand wall 24, a right-hand wall 26, and a front wall 28. In the illustrated embodiment, the side walls 24 and 26 are provided with deformed mounting portions 30 and 32, respectively, which are adapted to receive mounting screws 34 and 36 which connect the tuner mechanism 20 to a bracket 35 which is secured to the front panel 38 of the television receiver. However, it will be understood that any other suitable mounting arrangement may be employed for the main housing 20 insofar as the present invention is concerned.

A UHF tuner indicated generally at 40 includes a rectangular flat housing 42 the open bottom portion of which is closed by means of a cover 44 so as to provide a totally enclosed RF tuning compartment 46, a totally enclosed oscillator compartment 48, and a totally enclosed mixer compartment 50. The UHF tuner 40 is mounted on the rear portion of the top wall 22 of the main housing 20 by means of screws 52 which are positioned in slots 54 in the top wall 22 and extend into the top wall 56 of the UHF tuner housing 42.

A transversely extending rotor shaft indicated generally at 60 is rotatably mounted between the side walls 62 and 64 of the UHF tuner housing 42 and carries the capacitor plates 66 in the RF compartment 46, the capacitor plates 68 in the mixer compartment 50 and the capacitor plate 70 in the oscillator compartment 48. The rotor shaft 60 is electrically grounded at the boundaries of the tuning compartment 50 by means of the spring clips 72 and 74 positioned on transverse conductive wall partitions 76 and 78 secured to the tuner housing 42. The capacitor plates 66 cooperate with a stationary tuning structure 80 in the compartment 46, the capacitor plates 68 cooperate with a tuning structure 82 in the compartment 50 and the capacitor plates 70 cooperate with a tuning structure 84 in the oscillator compartment 48 so as to provide three UHF tuned circuits which may be adjusted to receive any station in the UHF television band by rotation of the rotor shaft 60, as will be readily understood by those skilled in the art.

Figure 9:
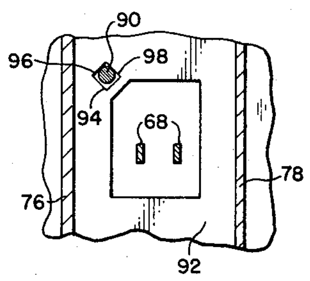
FIG. 9 is a fragmentary sectional view taken along the lines 9—9 of FIG. 3.
Figure 10:
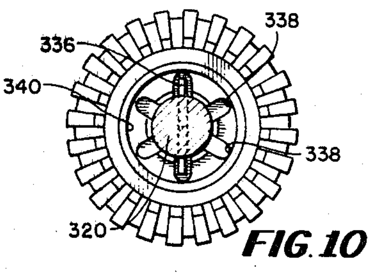
FIG. 10 is a fragmentary sectional view taken along the lines 8—8 of FIG. 4.

In order to drive the rotor shaft 60 from a memory type turret mechanism, a pinion gear 86 is secured to the rotor shaft 60 which is in engagement with rack teeth 88 formed in one end of a rack driveshaft 90 which is slidably mounted in the forward wall 92 of the UHF tuner housing 42, and the front wall 28 of the main housing 20. More particularly, as best illustrated in FIG. 9, the front wall 92 of the housing 42 is provided with a rectangularly shaped opening 94 which defines a pair of V-shaped bearing shoulders 96 and 98 on which the rack driveshaft 90 rides to provide a low friction bearing for the driveshaft 90 adjacent the rack teeth 88. The forward end of the driveshaft 90 is slidably mounted in a closely fitting aperture 100 formed in the front wall 28 of the housing 20.

Figures 3, 4, 14:
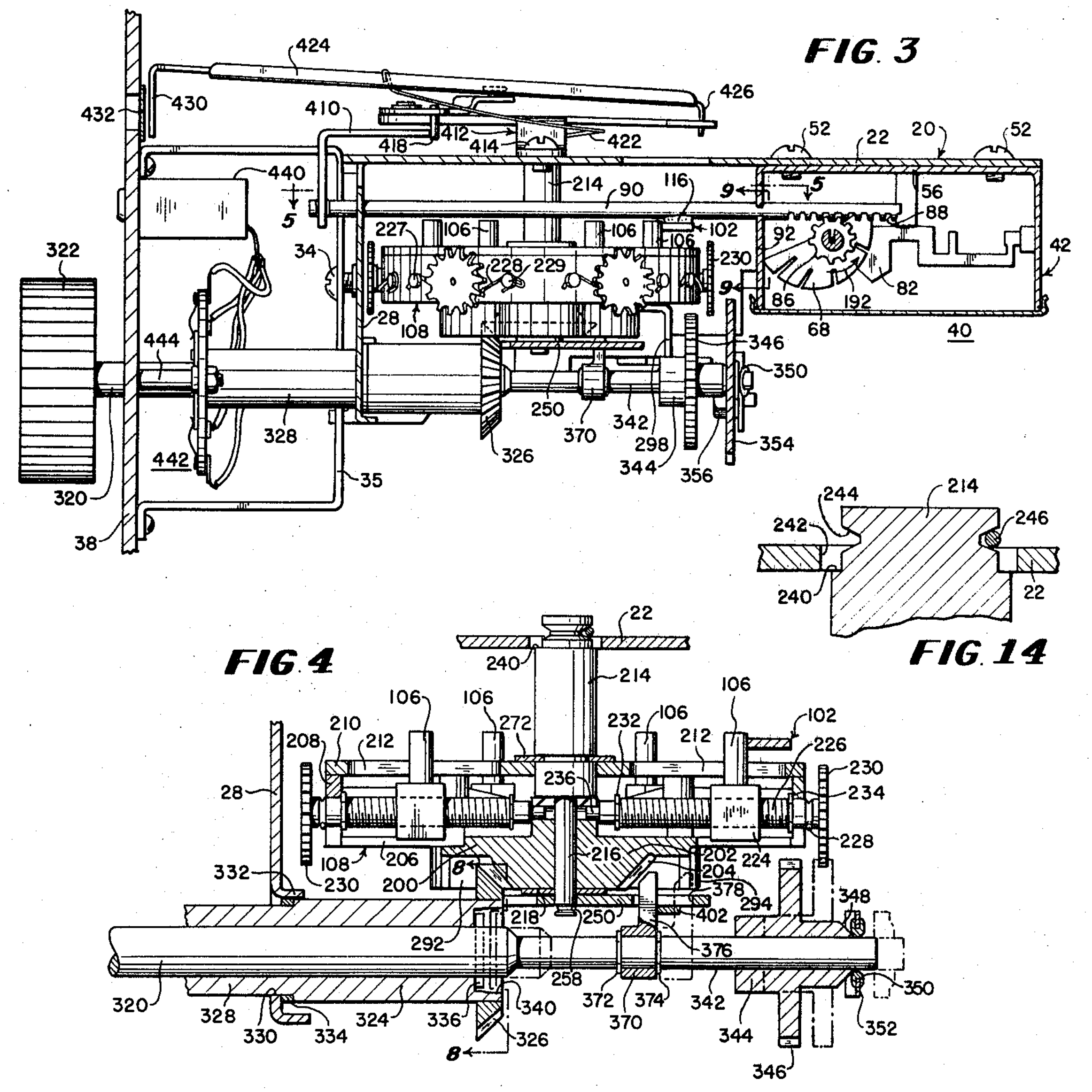
FIG. 3 is a sectional view taken along the lines 3—3 of FIG. 2.
FIG. 4 is a sectional view taken along the lines 4—4 of FIG. 2.
FIG. 14 is a fragmentary sectional view, on an enlarged scale, of the turret shaft mounting arrangement of FIG. 4.

A cam follower element 102 (FIG. 5) is secured to the driveshaft 90 ahead of the tuner wall 92 and is provided with an offset portion 104 which is adapted to be engaged by one of the six adjustment pins 106 of a rotatably mounted memory turret indicated generally at 108, to be described in more detail hereinafter. Specifically, the offset portion 104 is provided with an intermediate portion having an edge 110 which is perpendicular to the rack driveshaft 90 and connects with gently sloping edges 112 and 114 to provide a gradually sloping cam follower surface for engagement by one of the pins 106 as the turret 108 is rotated. As best illustrated in FIG. 3, the cam follower 102 is secured to the underside of the rack driveshaft 90 by means of a dimpled portion 116 so that the pins 106 may move freely under the shaft 90 and contact the edges 110, 112 and 114 of the cam follower 102.

Since one of the adjustment pins 106 engages the cam follower element 102 at a point offset from the rack driveshaft 90 it is necessary to stabilize the element 102 so that it will not become jammed and will actuate the shaft 90 smoothly to any desired position. To this end, the cam follower 102 is provided with an offset arm portion 111 the outer end of which extends through a slot 113 formed in the side wall 26 of the main housing 20. The arm 111 thus rides in the slot 113 as the shaft 90 is actuated to any position within the UHF tuning range and effectively prevents twisting or turning of the shaft 90 so that the rack teeth 88 are always in alignment with the pinion 86.

Figure 8:
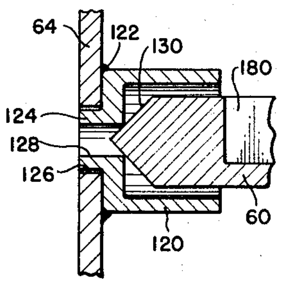
FIG. 8 is a fragmentary sectional view taken along the lines 10—10 of FIG. 2.

In order to provide a rotor shaft bearing structure for the rotor shaft 60 which is of extremely low friction so that this shaft may be adjusted to receive a given UHF station with the high degree of precision and may be accurately re-set to this position by engagement of a particular one of the pins 106 with the cam follower element 102, cone bearings of small diameter are employed at each end of the rotor shaft 60 and the friction exerted on the rotor shaft 60 by the grounding springs 72 and 74 is held to a minimum. More particularly, a cup-shaped bearing member 120 (FIG. 8) is secured to the side wall 64 of the UHF tuner housing 42, by means of the solder joint 122 or other suitable means. The cup 120 is provided with an annular projecting portion 124 of smaller diameter which extends through an opening 126 in the side wall 64 so that the cup 120 is located relative to the side walls 64. The cup 120 is provided with a central bore 128 in the bottom thereof, and the rotor shaft 60 is provided with a conically shaped end 130 which is seated in the bore 128 provided in the cup 120. As a result, a cone type bearing of relatively small diameter is provided for this end of the rotor shaft 60 so that an extremely low friction mounting of this end of the rotor shaft is achieved.

The other end of the rotor shaft 60 is rotatably mounted in a tongue portion 132 (FIG. 13) provided in a plate 134 which is mounted on the inside of the side wall 62 of the tuner housing 42, the tongue 132 being positioned within a U-shaped notch 136 formed in the wall 62. The upper edge of the plate 134 is soldered to the wall 62 and the bottom edge of the plate 134 is provided with an offset end flange 138 which spaces the plate 134 away from the wall 62 and provides a predetermined spring bias for the tongue portion 132. The end of the rotor shaft 60 adjacent the tongue 132 is provided with a section 140 of reduced diameter having a conical portion 142 which terminates in an end portion 144 of still smaller diameter which is positioned within an opening 146 in the tongue 132. The conical bearing surface 142 is seated on the inner edge of the opening 146 and the spring bias exerted by the tongue portion 132 functions to hold the bearings 130 and 142 on their respective bearing seats.

In order to reduce the friction on the rotor shaft 60, the grounding springs 72 and 74 are arranged so that they contact the rotor shaft 60 only in areas where a smooth surface is presented to the shaft 60. Furthermore, these springs are arranged so that they exert an axial thrust on the shaft 60 which is in the same direction as the bias produced by the tongue portion 132. As a result, the spring 72 and 74 contribute to the total force which holds the conical bearing 130 on its seat, a condition which would not be achieved if conventional U-shaped or double acting ground springs were employed. More particularly, the ground springs 74, for example, is provided with a slot 150 (FIG. 11) in the bottom edge thereof so that the spring 74 may be slipped over the rotor shaft 60 and the intermediate portion of this spring may engage the end face of a relatively deep groove 154 formed in the rotor shaft 60. Furthermore, the shaft 60 is provided with a portion 156 of reduced diameter in the vicinity of the slot 158 which is provided in the partition wall 78 to receive the rotor shaft 60 when it is initially loaded into the UHF tuner.

Figures 5, 6, 11, 12:
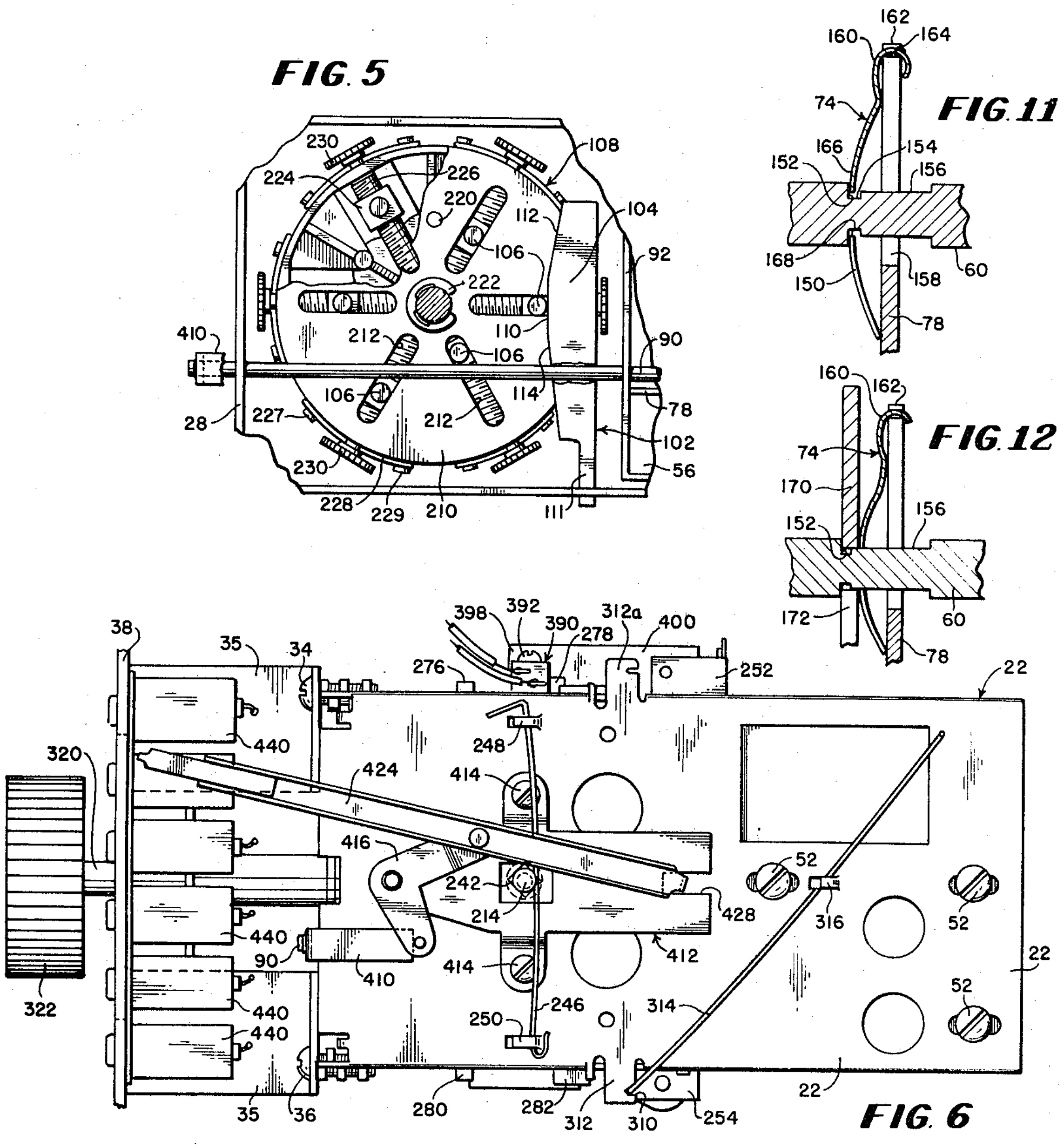
FIG. 5 is a sectional view taken along the lines 5—5 of FIG. 3 and shown with a portion of the turret mechanism broken away.
FIG. 6 is a top view of the tuning arrangement of FIG. 1.
FIG. 11 is a fragmentary sectional view taken along the lines 11—11 of FIG. 2.
FIG. 12 is a view similar to FIG. 11 but showing the manner in which the grounding spring is assembled in the tuner.

The intermediate portion of the ground spring 74 is bowed so that this portion rides on the end face 152 and the upper and lower end portions of this spring are pressed into engagement with the side of the partition 78, as shown in FIG. 11. The upper end of the ground spring 74 is provided with a curved portion 160 the edges of which are arranged to be seated in notches 162 formed in the upper edge of the partition 78, the curved portion 160 being soldered to the partition 78 so as to maintain the ground spring 74 in the desired position, as indicated at 164. It will be noted that with this arrangement only the outer surface 166 of the intermediate portion of the ground spring 74 engages the end face 152 formed in the shaft 60. Due to the provision of the deep groove 154 the edges 168 of the notch 150 in the vicinity of the groove 154, which may be quite rough, do not engage the shaft 60 and hence do not interfere with the precise adjustment of this shaft to any desired position in the UHF tuning band.

In order to position the ground spring 74 properly with respect to the rotor shaft 60 after this shaft has been assembled in the tuner and the bearings 130 and 142 seated in their respective bearing seats, the ground spring 74 is mounted on the partition 78 in the manner shown in FIG. 12 prior to the soldering operation and a jig insert 170, which is provided with a slot 172 in the bottom end thereof, is inserted between the intermediate portion of the ground spring 74 and the end face 152 formed in the shaft 60 with the result that the intermediate portion of the spring 74 is compressed until the slotted portion thereof is moved into alignment with the portion 156 of the shaft 60 which is of larger diameter than the portion of this shaft in the vicinity of the deep groove 154. Accordingly, the portion 156 acts as a centering device, in conjunction with the jig fixture 170, for the ground spring 74 which is then soldered in position on the partition 78. The jig fixture 170 is then removed and the intermediate portion of the ground spring 74 returns to its normal position in engagement with the end face 152, as shown in FIG. 11. However, by employing the portion 156 of intermediate diameter as a centering means when the spring clip 74 is assembled and soldered in place, engagement of the rough edges 168 of this spring clip with any portion of the shaft 60 is prevented.

In order that the rotor shaft 60 will be accurately positioned in response to engagement of one of the pins 106 with the cam follower 102, it is necessary that a torque of relatively small value be continuously exerted on the shaft 60 so that the cam follower 102 will be biased into engagement with one of the pins 106 in the active position of the turret 108. This bias should also be such that backlash between the teeth of the pinion gear 86 and the rack teeth 88 will be eliminated and the rack driveshaft 90 will be urged upwardly into engagement with the V-bearing surfaces 96, 98 of the opening 94 provided in the wall 92 of the housing 42. A torque could be exerted on the shaft 60 by means of a simple coil spring wrapped around the rotor shaft 60 and connected to a fixed point in the tuner housing 42. However, such an arrangement would have undesired electrical effects due to movement of portions of the spring within one of the compartments of the UHF tuner during the tuning operation, it being understood that the resonant frequency in each compartment of the UHF tuner is influenced by the position or movement of any conductive members within this compartment.

Figure 15:
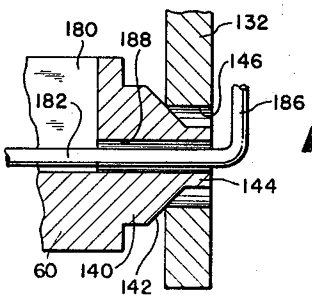
FIG. 15 is a fragmentary sectional view similar to FIG. 13 but taken on a large scale.

In order to produce the desired torque on the shaft 60 without introducing any undesired electrical effects, and in accordance with an important feature of the present invention, the rotor shaft 60 is provided with a slot 180 (FIG. 2) along the length thereof and to a depth just slightly beyond the center of the shaft 60. A spring wire 182 is positioned in the bottom of the slot 180 in the vicinity of the central axis of the shaft 60. The end 184 of the spring 182 is bent at right angles so that it extends out of the slot 180 and is hooked around one of the capacitor plates 70 secured to the rotor shaft 60. This end of the spring 182 is thus effectively anchored to the rotor shaft 60. The other end 186 (FIG. 15) of the spring 182 extends outwardly through an opening 188 drilled in the end of the rotor shaft 60 and communicating with the slot 180. The end 186 of the spring 182 extends at right angles along the plate 134 within the slot 136 formed in the wall 62 and is bent over the upper end of the plate 134 and downwardly so that the end 186 of the spring 182 is effectively secured to the plate 134 and hence is stationary. If desired, the upper end of the right angle end portion 136 may be secured to the plate 134 by soldering, as indicated at 190 in FIG. 13.

Figure 13:
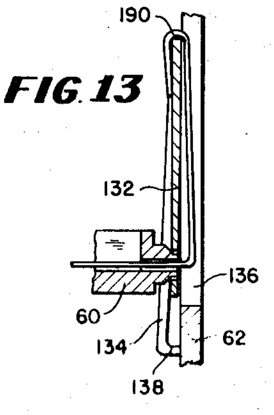
FIG. 13 is a fragmentary sectional view taken along the lines 13—13 of FIG. 2.

The spring wire 182 is assembled within the groove 180 before the rotor plates are assembled on the shaft 60 and the completed rotor assembly is then assembled into the tuner by feeding the end portion 186 of the spring 182 through the opening 146 in the tongue 132. The right angle portions formed in the ends of the wire spring 182 are preformed at an angle to one another such that when the rotor assembly is loaded into the tuner and the end portion 186 is positioned within the slot 136 and secured to the tongue 132 a predetermined initial torque is exerted on the rotor shaft 60. For example, the ends of the spring 182 may be preformed so that at the maximum capacity position of the shaft 60 the end 186 has to be twisted through an angle of approximately 270° to be positioned as shown in FIG. 13 in the notch 136. Such an arrangement has been found to provide the necessary torque with a wire 182 formed from music wire 0.010 inch in diameter and slightly over 2 inches in length between the right angle end portions thereof. As the rotor shaft 60 is rotated from one end of the UHF tuning band to the other, the wire spring 182 is twisted more since the end 184 of this spring is secured to the rotor shaft 60 and the other end is secured to the plate 134. Since the effective length over which the wire spring 182 is twisted is in the order of 2 inches, a torque which increases at a relatively slow rate is exerted on the rotor shaft throughout the UHF tuning range. This torque continuously biases the teeth of the pinion gear 86 into engagement with the rack teeth 88 so as to eliminate backlash between these elements. Furthermore, the torque exerted on the rotor shaft 60, which is exerted in the direction of the arrow 192 (FIG. 3), causes the teeth of the pinion gear to exert a separating force on the rack teeth 88 so that an upward force is exerted on the rear end of the rack driveshaft 90 which is effective to hold the shaft 90 in engagement with the V-bearing surfaces 96, 98 in the tuner wall 92 (FIG. 9). Also, since the spring wire 182 is positioned within the rotor shaft 60 which is electrically grounded, not only by engagement of the bearing surfaces 130 and 142 with their respective bearing seats but also by the grounding springs 72 and 74, the mechanical torque which is exerted on the shaft 60 by the wire spring 182 does not in any way interfere with the electrical characteristics of the UHF tuner. In this connection it will be understood that the mounting of the spring wire 182 by providing the slot 180 in the rotor shaft 60 is merely illustrative of one way in which the spring wire 182 may be mounted. Other ways may obviously be employed. For example, the rotor shaft 60 may be in the form of a hollow tube having annular sloping end portion bearing surfaces, corresponding to the conical bearings 130 and 142, and having end portions of reduced diameter extending through the opening 126 or 128, at one end, and the opening 146 in the tongue 132 at the other end. A spring wire similar to the spring wire 182 may be secured to this tubular rotor shaft at one end thereof and the other end of the wire brought out and secured to a fixed point in a manner similar to the end portion 186 of the spring wire 182.

The turret assembly 108 comprises a main casting indicated generally at 200 (FIG. 4) having a central hub portion 202 in which are formed the downwardly extending beveled gear teeth 204. The casting 200 further comprises a bottom wall 206 which extends outwardly from the hub portion 202 and connects to an annular upstanding outer wall 208. A separate cover member 210 rests on the upper edge of the outer wall 208 and is provided with a series of six radially extending slots 212 within which are positioned the adjusting pins 106. A centrally located turret shaft 214 is provided with a bottom portion 216 of smaller diameter which is press fitted into the hub portion 202 and may be retained, if desired, by a C washer 218. The cover 210 is located relative to the casting 200 by means of a pin 220 (FIG. 5) on the casting 200 which extends through a corresponding opening in the cover 210 and the cover 210 is held in place by means of a C washer 222 which fits into a corresponding groove in the turret shaft 214. Each of the pins 106 is integrally formed with a rectangular nut portion 224 which is threaded on a radially extending adjustment screw 226 the outer end of which is rotatably mounted in the wall 208 of the casting 200 and is held against suitable bearing surfaces by means of a retaining spring 228 which fits into a corresponding groove in the adjustment screw 226. Each of the retaining spring 228 is retained against a pair of projecting studs 227 and 229 (FIG. 3) formed in the periphery of the wall 208. An adjustment gear 230 is formed in the outer end of each adjustment screw 226 beyond the periphery of the outer wall 208. Travel of the nut 224 along the adjustment screw 226 is limited by means of a pair of C washers 232 and 234 positioned at either end of the threaded portion of the screw 226. The inner end 236 of each adjustment screw 226 is seated in a corresponding radially extending opening formed in the hub portion 202, as best illustrated in FIG. 4.

It will be evident from the foregoing description that upon rotation of the gear 230 the nut 224 and hence its corresponding pin 106 may be moved along the length of the adjustment screw 226 until the nut 224 strikes one of the retaining washers 232 or 234. This range of movement of the pin 106 is correlated with the corresponding longitudinal movement of the rack driveshaft 90 so that the entire UHF tuning range of the tuner 40 may be covered when the pin 106 is moved from one end of its range of travel to the other. Since seventy UHF channels must be individually selectable by adjustment of the pin 106 through its tuning range, the threads of the adjustment screw 226 will necessarily be of quite fine pitch, the exact pitch depending upon the desired ratio for the UHF channel selecting operation between the gear 230 and the adjustment screw 226, as will be readily understood by those skilled in the art.

The upper end of the turret shaft 214 is provided with a shoulder 240 which is urged against the edges of a rectangularly shaped opening 242 formed in the top wall 22 of the main housing 20, the upper end of the turret shaft 214 extending upwardly above the top wall 22 and being provided with a groove 244 within which is positioned a bowed retaining wire 246. The outer ends of the retaining wire 246 are positioned between upturned lugs 248 and 250 in the top wall 22 and the retaining spring 246 urges the turret shaft 214 into engagement with the V-shaped sides of the opening 242 in the wall 22 so that the upper end of the turret shaft 214 is accurately located with respect to the main housing 20. Preferably, the groove 244 is also of V-shaped cross section so that the spring 246 functions to hold the shoulder 240 against the underside of the top wall 22 so that the turret assembly 108 is accurately positioned in this direction relative to the housing wall 22.

In order to provide a mounting for the bottom portion 216 of the turret shaft 214 which will be accurately located relative to the top V-bearing surfaces 242 in such manner that the turret shaft 214 will be perpendicular to the wall 22, a cover bracket 250 is arranged to be seated on the edges of the side walls 24 and 26 of the main housing 20 and on outwardly turned flange portions 252 and 254 formed in the side walls 21 and 26, respectively. The cover 250 is provided with a rectangularly shaped opening 256 which provides adjacent V-bearing edges against which the shaft portion 216 is held by means of a retaining wire 258, as best illustrated in FIG. 2. The retaining wire 258 is positioned and retained by means of a pair of lug portions 260 and 262 formed downwardly from the cover member 250 so that the retaining spring 258 urges the shaft 216 into engagement with the V-bearing edges of the rectangular opening 256 and the bottom end of the turret shaft 214 is accurately referenced with respect to the cover 250. However, it is also necessary accurately to reference the cover 250 with respect to the main housing 20. This is accomplished in a simple economical and reliable manner by providing a pair of forwardly extending tongues 264 and 266 on the front edge of the cover 250, the tongues 264, 266 extending through corresponding slots 270 and 272 (FIG. 1) formed in the front wall 28 of the housing 20. The tongues 264 and 266 engage the inner adjacent edges of the slots 270 and 272 so that the cover member 250 is accurately located with respect to the housing 20 in the direction of the arrow 274 shown in FIG. 1. In addition, a first pair of tongue portions 276 and 278 (FIG. 2) are provided on one side of the cover 250 and a second pair of tongue portions 280 and 282 are provided on the other side of the cover 250. The first pair of tongue portions 276, 278 cooperate with a downwardly extending tongue 284 formed in the side wall 24 so that an interlocking tongue connection is established between the cover 250 and the side wall 24. In a similar manner the tongues 280 and 282 cooperate with a downwardly extending tongue portion 286 on the side wall 26 to accurately locate this edge of the cover 250 in a direction from front to back of the tuner. As a result of the interlocking tongue structure described above, the bearing opening 256 in the cover 250 is accurately referenced with respect to the bearing opening 242 in the top wall 22 so that when the cover 250 is assembled onto the main housing 20, the turret shaft 214 is exactly perpendicular to both the wall 22 and the cover 250. With this arrangement a precise mounting for the turret assembly 108 is provided while employing stamped parts which are relatively inexpensive for the main housing 20 and the cover 250. The cover 250 is held in place at the rear edge thereof by means of a pair of mounting screws 288 and 290 which secure the back edge of the cover 250 to the mounting brackets 252 and 254.

In order to provide a detent arrangement whereby the turret assembly 108 may be accurately restrained or detented at any one of six positions of the turret 108, a depending skirt portion is provided in the casting 200 outside the beveled gear teeth 204, this skirt portion comprising a series of six arcuate sections 292 which are separated from each other by the slots 294 (FIG. 2). The outer peripheries of the arcuate skirt portions 292 form a scalloped surface which is engaged by a V-shaped portion 296 formed in the free end of a detent spring 298, the sides of the V-shaped portion 296 riding on adjacent portions of two of the arcuate skirt portions 292, as best illustrated in FIG. 2. The end portion 298 of the detent spring extends upwardly into an opening 251 formed in the cover 250 so that the V-bearing surface 296 thereof can engage the periphery of the skirt portions 292.

The detent wire 298 is provided with a first right angle portion 300 (FIG. 1), the bottom end 300a of which is positioned within a notch 302 formed in an adjustment bracket 304. The bracket 304 is pivotally mounted on the depending tongue 286 of the side wall 26 by means of a V-shaped opening 306 provided in the bracket 304 and the bracket is held in adjusted position by means of the screw 288 which extends through an elongated slot 308 provided in the bracket 304. As a result of the limited pivotal movement of the bracket 304 afforded by the V-shaped slot 306, the position of the slot 302 in the bracket 304 may be adjusted which in turn adjusts the position of the V-shaped end portion 296 of the detent wire section 298. Accordingly, by adjustment of the bracket 304 the position of the turret assembly 108 may be adjusted for alignment purposes to be described in more detail hereinafter.

The upper end 300b of the detent wire section 300 is located in a notch 310 (FIG. 6) formed in an outwardly extending tab portion 312 of the top wall 22 of the main housing 20. Immediately beyond the tab 312, the detent wire is provided with another right angle portion 314 which also extends at an angle away from the tab 312 and is positioned beneath an upturned lug portion 316 formed in the top wall 22. The bottom of the slot 310 is provided with V-bearing surfaces and the bottom of the slot 302 in the bracket 304 is likewise provided with V-bearing surfaces 302a (FIG. 2). The detent wire comprising the portions 298, 300 and 314 is preformed so that when assembled in the tuner mechanism the intermediate portion 300 is held rigidly against the bearing surfaces provided in the bottom of the notches 310 and 302, so that the portion 298 is accurately located relative to the main housing 20. Furthermore, the end portion 298 is preformed so that when assembled as shown it exerts a substantial detent force on the scalloped surface provided by the skirt portions 292 of the turret assembly 108. As a result of this arrangement the turret assembly 108 is accurately detented in all six of the positions of this turret by means of the above-described detent wire which may be readily removed for service or repair of the tuner mechanism.

The turret assembly 108 may be rotated to any one of the six detent positions by any suitable means such as a manually operable shaft or, in the alternative, a motor drive arrangement involving a Geneva wheel and rotatable pin. In the illustrated embodiment, the turret assembly 108 is arranged to be manually actuated from a common input shaft 320 which extends through the front panel 38 and has a control knob 322 positioned on the outer end thereof. The shaft 320 is also arranged to be moved rearwardly to accomplish a fine tuning memory adjustment at a particular detent position so that the memorized UHF channel can be changed as desired by the operator, More particularly, an outer driveshaft 324 is rotatably positioned on the control shaft 320 and is provided with a beveled gear portion comprising the beveled gear teeth 326 which are held in mesh with the beveled teeth 204 of the turret assembly 108. The driveshaft 324 is loosely mounted in the front wall 28 of the main housing 20 by providing a forward portion 328 which is of reduced diameter and is positioned within an opening 330 in the front wall 28, a rearwardly extending tongue portion 332 being provided at the top of the opening 330, as best illustrated in FIG. 4. One or more spacers, such as the spacer 334, may be provided between the front wall 28 and the shoulder formed by the reduced diameter section 328 of the shaft 324 so that the beveled gear teeth 326 are positioned in correct registry with the bevel gear teeth 204.

In order to drive the shaft 324 from the control shaft 320 a transverse pin 336 is positioned in the control shaft 320, the pin 336 being normally positioned in a pair of opposed recesses or slots 338 provided in the bottom of a rearwardly extending recess 340 formed in the end of the shaft 324. When the pin 336 is located in a set of the slots 338, the control shaft 320 is directly connected to the driveshaft 324. Under these conditions, rotation of the control shaft 320 is effective to rotate the turret 108 through the bevel gear teeth 326 and 204. The turret 108 may thus be rotated to any one of the six detent positions as established by the skirt portions 292 and detent spring 298.

As discussed above, the control shaft 320 may also be moved rearwardly to effect a fine tuning operation in which the memorized UHF channel may be changed as desired by the operator. To this end, the control shaft 320 is provided with a rearwardly extending portion 342 of reduced diameter to which is secured a hub 344 provided with an adjustment gear 346. The rearward end of the hub 344 is provided with a beveled surface 348 which acts as the bearing surface for the rear end of the control shaft 320. A bearing seat for the surface 348 is provided by a brass eyelet 350 which is mounted in the end of a flat spring member 352 which may be of hardened clock spring material and provides a resilient mounting for the rear end of the shaft 320 and normally biases the pin 336 into the slots 338. The flat spring 352 is mounted on a downwardly depending rear flange portion 354 (FIG. 2) of the cover 250. Thus, a screw 356 extends through the bracket wall 354, through the flat spring 352 and is threaded into a keeper bracket 358 which is provided with a pair of right angle ear portions 360 which cooperate with a tongue portion 362 of the bracket 354 to retain the spring 352 locked in its adjusted position.

The outer end portion 364 of the clock spring 352 is bent at a slight angle so that as the control shaft 320 is pushed rearwardly an accurate bearing contact is maintained between the eyelet 350 and the beveled bearing surface 348 on the hub 344 which is secured to the shaft 342. The control shaft 320 may thus be moved rearwardly by rearward pressure on the knob 322 so that the gear 346 will be moved to the position shown in dotted lines in FIG. 4 at which position the gear 346 is in mesh with one of the gears 230 on the end of the adjustment screw 226 which controls the active one of the adjusting pins 106 then in engagement with the cam follower element 102. The control shaft 320 may then be rotated while rearward pressure thereon is maintained so that the gear 230 may be rotated and the pin 106 moved throughout the UHF tuning band so that any desired UHF station may be precisely selected.

When rearward pressure on the knob 322 is removed the flat spring 352 functions to bias the control shaft 320 forwardly to such position that the pin 336 is again seated in a set of grooves 338 in the recess 340. When this occurs the control shaft 320 is again connected to the driveshaft 324 and the control shaft 320 may then be rotated to select any one of the six memorized UHF channels by rotation of the turret assembly 108. The flat spring 352 is provided with a relatively large clearance hole for the screw 356 so that the end portion 364 of the spring 352 may be adjusted over a relatively large area to position the rear end of the control shaft 320. Accordingly, the control shaft 320 may be accurately positioned by adjustment of the spring 352 so that the gears 346 and 230 mesh properly, after which the spring 352 is clamped by tightening the screw 356. It will be noted that the shaft assembly including the control shaft 320 and the driveshaft 324 may be removed as a unit by moving the free end of the spring 352 rearwardly an amount sufficient to clear the end of the control shaft portion 342 after which the control shaft assembly may be dropped downwardly and moved rearwardly out of the bearing formed by the opening 330 and the flange 332.

In order to control the amount of rearward movement which may be achieved by exerting rearward pressure on the control knob 322, a control member 370 is rotatably mounted on the control shaft portion 342 between the retaining C washers 372 and 374. The control member 370 is provided with an upstanding tab portion 376 which slides within a slot 378 (FIG. 4) formed in the cover 250. In the forward position of the control shaft 320 the tab 376 occupies the position shown in FIG. 4 wherein it clears the bevel gear teeth 204. However, when the control shaft 320 is moved rearwardly the tab 376 moves to the position shown in dotted lines in FIG. 4 and strikes the end of the slot 378 and prevents further rearward movement of the control shaft 320. When the control shaft 320 is in this position, the gear 346 is in the position shown in dotted lines in FIG. 4 and is in mesh with one of the gears 230.

When the control shaft 320 is moved rearwardly and a fine tuning or memory adjustment operation is performed during which the screw 230 is rotated, it will be evident that the active screw 230 may be rotated until the nut 224 is moved against one of the retainers 232 or 234. Since the threads of the adjustment screw 226 are relatively fine, a substantial force may be exerted on the turret assembly 108 when one of these retainers 232 or 234 is reached. If the turret 108 is not held in locked position while a fine tuning operation is being effected, the separating force exerted when the nut 224 reaches one end of its adjustment range could be sufficient to move the turret away from the driving gear 346 and cause jamming of the nut 204. To prevent this, the upstanding tab 376 is arranged to move into one of the slots 294 between the two adjacent skirt portions 292 which are then being engaged by the V-bearing portion 296 of the detent spring. Thus, when the tab 376 is moved to the position shown in dotted lines in FIG. 4, the upper end portion of this tab is moved into the slot 294. The turret assembly 108 is then restrained by the tab 376 so that jamming of the adjustment screw 226 at either end of travel thereof is prevented. When rearward pressure on the knob 322 is removed, the tab 376 moves back to the position shown in full lines in FIG. 4 in which position it is inside of the skirt portions 292 and hence does not thereafter interfere with rotation of the turret assembly 108.

Since the slots 294 are just slightly wider than the tab 376 it is necessary to align the turret assembly 108 accurately with respect to the tab 376 so that the upper end of the tab 376 may enter one of the slots 294 during a fine tuning operation. Accordingly, the adjustment bracket 304 may be pivoted slightly by loosening the screw 288 and moving the bracket 304 so that the V-bearing portion 296 which engages the skirt portions 292 is moved in a direction along the length of the portion 298, which has the effect of causing a slight rotational movement of the turret assembly 108. The bracket 304 is thus adjusted until the slots 294 are aligned with the tab 376 after which the bracket is clamped in adjusted position by tightening the screw 288.

In order to provide an AFC defeat switch which may be actuated each time a fine tuning operation is effected and may also be actuated during periods when the turret 108 is rotated from one detent position to another, there is provided a detent switch indicated generally at 390 in FIG. 6 which is mounted on the side wall 24 by means of the screw 392. The switch 390 comprises a pair of flexible arms 394 and 396 (FIG. 2), the outer arm 396 being engaged by an offset arm 398 of a flat control member 400 which may be of insulating material. The member 400 is pivotally mounted on the mounting screw 290 beneath the cover 250 and has a right angle arm portion 402 which extends inwardly and is engaged by the tab 376 on the control shaft 320. When the control shaft 320 is moved rearwardly, the tab 376 engages the arm 402 and pivots the member 400 so that the switch contacts carried by the flexible arms 394 and 396 are closed. Closure of the contacts of the switch 390 may then be employed to ground or otherwise remove the AFC control voltage which is normally employed to provide automatic frequency control in the associated television receiver. Accordingly, each time a fine tuning adjustment is made, wherein the UHF tuner is adjusted to a new UHF channel, the AFC control voltage is short circuited or grounded so that it will not interfere with the tuning of the UHF tuner 40 to the new channel. However, as soon as the control shaft 320 is released and is returned to its normal position by the spring 352, the member 400 is returned to its normal position by the spring bias of the arm 396 so that the AFC control voltage is again rendered effective to maintain the UHF tuner tuned to the selected UHF channel, as will be readily understood by those skilled in the art.

In order to actuate the member 400 so that the switch 390 is closed during periods when the turret 108 is moved from one detent position to another, the detent wire portion 298 is provided with a right angle end portion 404 (FIG. 2) beyond the V-bearing portion 296, the right angle end portion 404 being positioned in engagement with an offset portion 406 of the control member 400. When the turret assembly 108 is moved to a new position, the V-bearing portion 296 and hence the right angle end portion 404 of the detent wire is moved outwardly to the position shown in dotted lines in FIG. 2. When this occurs, the end portion 404 pivots the control member 400 and closes the switch contacts attached to the arms 394 and 396 so that the AFC control voltage is grounded in the same manner as described heretofore in connection with the fine tuning operation. However, when the V-bearing portion 296 is moved to the next detent position, the detent wire is brought to the position shown in full lines in FIG. 2 and the control member 400 is pivoted back to its normal position in which the contacts of the switch 390 are open and AFC control is again continued.

While rotation of the turret assembly 108 is effective to adjust the rack driveshaft 90 to any desired position throughout the UHF tuning range, so that a memorized UHF channel may be automatically selected, it is also necessary to provide a suitable indication of the particular UHF channel which is being received, as established by the position of the driveshaft 90. In the illustrated embodiment, a simple dial and pointer arrangement is employed in conjunction with a suitable control linkage to indicate the position of the shaft 90. However, it will be understood that any other suitable shaft indicator arrangement may be employed. With regard to the specific embodiment disclosed, a right angle bracket 410 is mounted on the end of the shaft 90 beyond the front wall 28 of the main housing 20. A main indicator bracket, indicated generally at 412, is mounted on the top wall 22 by means of the screws 414. A bell crank member 416 is pivotally mounted on the forward end of the bracket 412, one arm of the bell crank 416 carrying a pin 418 which is biased into engagement with the end 420 of the bracket 410 by means of the spring 422 (FIG. 3). The other end of the bell crank 416 is pivotally connected to a pointer arm 424, the rear end of which is provided with a tongue portion 426 which slides in a slot 428 provided in the rear end of the bracket 412. The forward end of the indicator arm 424 is provided with a pointer 430 which cooperates with a scale 432 to indicate which one of the seventy UHF channels the UHF tuner 40 is then receiving.

As the driveshaft 90 is moved in and out to different UHF station positions, the bell crank 416 is pivoted and swings the indicator arm 424 across the length of the scale 432 so as to indicate the particular UHF channel being received. The light loading afforded by the spring 422 maintains the pin 418 in engagement with the end of the bracket 410 so as to follow movement of the driveshaft 90 when the turret 108 is rotated to different detented positions. It will be noted that the force of the spring 422 is in the same direction as the torque exerted on the rotor shaft 60 so that the force contributed by the spring 422 assists holding the cam follower element 102 in engagement with one of the pins 106.

While the indicator pointer 430 provides an indication of the UHF channel being received, this indication is not precise due to the fact that seventy UHF channels are provided on the scale 432. In accordance with a further feature of the invention, a dial light indication is also provided for each of the six positions of the turret assembly 108. More particularly, a bank of six indicator lights 440 is provided below the scale 432, the indicator lights 440 being arranged to be selectively energized by means of a rotary type wafer switch indicated generally at 442 which is mounted behind the front panel 38 on the posts 444. The forward portion 328 of the driveshaft 324 is arranged to actuate the rotor of the wafer switch 442 so that this switch is moved to one of six positions corresponding to the six detent positions of the turret 106. The indicator lights 440 are arranged to be energized from any suitable current source through the wafer switch 442, as controlled by the position of the shaft 328. Accordingly, when the knob 322 is rotated to the first one of the six detent positions, the first one of the lights 440 is energized. When the turret 108 is moved to the second position, the second light is energized, etc. Illumination of one of the indicator lights 440 thus provides an indication which may be viewed throughout the entire room that a particular memory UHF channel is being received. Since the UHF channels assigned to different detent positions are normally retained for a considerable length of time, the operator need not look at the pointer 430 and scale 432 to determine the particular UHF channel received but instead may simply see which one of the lights 440 is illuminated. He knows by experience that the first light represents channel 35, for example. Also, if permanent channels are to be assigned to each of the six detent positions, the channel assigned to a particular indicator light may be indicator by a number positioned immediately above its corresponding indicator light 440. The operator then need not refer at all to the scale 432.

While the control knob 322 is used for both manual selection of any one of the six memorized UHF channels and adjustment of the UHF tuner to any new UHF channel at any one of the six positions, in certain instances it may be desirable to employ a separate control knob for these two functions. Under these conditions the control shaft 328, which is concentric with the selector shaft 320, may be brought out through the front panel 38 and a larger concentric knob connected thereto. This concentric knob will then act solely as a station selector knob to select any one of the six memorized UHF channels by rotation of the shaft 328. The control knob 322 may still be pushed rearwardly and rotated to effect a change in the tuning of the UHF tuner so as to change the memorized channel to a different UHF station. However, with such an arrangement it is necessary that the two shafts 320 and 328 be independently rotatable. Accordingly, the slots 338 and raised portions therebetween are eliminated in the end portion of the shaft 324 and a smooth bottom surface is provided for the end recess 340 so that the pin 336 may be moved within the recess 340 without causing the shaft 324 to rotate.

While in the illustrated embodiment the selection of any one of the six UHF channels is performed manually by manipulation of the knob 322, it will be understood that the tuner of the present invention is also adapted for motorized control of rotation of the turret assembly 108. This may be conveniently accomplished by extending the turret shaft 214 above the top housing wall 22 and securing a Geneva wheel having six slots to the end of this shaft above the wall 22. Under these conditions the indicator arrangement comprising the brackets 410 and 412 and the shaft 424 are preferably removed and some other suitable means for indicating the position of the shaft 90 is employed. An electric motor may then be conveniently mounted on the top wall 22 and provided with an appropriate gear train terminating in a rotatable pin structure arranged to enter into the slots of the Geneva wheel and rotate the turret assembly 108 one-sixth of a revolution for each revolution of the pin structure, as will be readily understood by those skilled in the art.

In accordance with a further aspect of the invention, the UHF tuner mechanism described heretofore is arranged so that it may be adapted with different types of television receivers and television cabinets wherein space requirements may be quite radically different. To this end, the detent wire, the detent wire adjustment bracket 304, the AFC defeat control member 400 and the spring 352 are arranged so that they may be repositioned symmetrically to accommodate different space requirements in a particular receiver. More particularly, the adjustment bracket 304 may be mounted on the screw 290 and the AFC defeat control member 400 may be mounted on the screw 288. The detent wire is then positioned between the lug 316 and a V-bottomed slot in a tab projection 312a which is symmetrical with the tab 312. The flat spring 352 may also be reversed in position on the bracket 354. Furthermore, an opening 393 is provided in the side wall 26 to provide a locating tab 395 and a hole 391 is provided for a screw similar to the screw 392 so that an AFC defeat switch 390 may be mounted on the side wall 26 and cooperate with the reversed position of the control member 400.

While but a single embodiment of the present invention has been here specifically disclosed, it will be apparent that many variations may be made therein, all within the true spirit and scope of the invention.

What is claimed as new and desired to be secured by Letters Patent of the United States is:

1. In a UHF tuner, the combination of, a conductive housing having a pair of opposed walls, a conductive rotor shaft rotatably mounted in said opposed walls and having a plurality of tuning elements thereon, a plurality of fixed tuning elements positioned within said housing and cooperating with said tuning elements on said rotor shaft, an elongated member extending generally along the axis of rotation of said rotor shaft, means connecting a first portion of said member to said rotor shaft so that said first portion rotates with said rotor shaft, and means connecting a second portion of said member which is spaced from said first portion thereof to a fixed point, whereby the intermediate portion of said member between said first and second portion is twisted as said rotor shaft is rotated and exerts a torque thereon tending to resist said rotation.

2. The combination of claim 1, wherein said intermediate portion has a predetermined amount of twist when said tuning elements are at the minimum range position so that an initial torque is exerted on said rotor shaft at said position.

3. The combination of claim 1, wherein said elongated member is of sufficient length that the torque exerted on said rotor shaft increases at a relatively low rate throughout the range of travel of said tuning elements.

4. The combination of claim 1, wherein said elongated member comprises a wire having a length in the order of two inches between said first and second portions thereof.

5. The combination of claim 1, wherein said elongated member has a diameter in the order of 0.010 inch.

6. In a UHF tuning mechanism, the combination of, a main housing, a turret rotatably mounted in said housing and having a plurality of independently adjustable members mounted thereon, a UHF tuner housing mounted on said main housing, said UHF tuner housing having a pair of opposed walls, a conductive rotor shaft rotatably mounted in said opposed walls, said UHF tuner housing having another wall between said rotor shaft and said turret, an opening in said another wall defining a pair of bearing surfaces, a control shaft positioned in said opening and riding on said bearing surfaces, gear means interconnecting said control shaft and said rotor shaft within said UHF tuner housing, a follower element connected to said control shaft outside said UHF tuner housing and adapted to be engaged by different ones of said adjustable members as said turret is rotated, and means for resiliently biasing said follower element into engagement with the active one of said adjustable members.

7. The combination of claim 6, wherein said resilient biasing means comprises a torsion wire extending along the axis of rotation of said rotor shaft and having one end thereof connected to said rotor shaft and the other end connected to said UHF tuner housing.

8. The combination of claim 7, wherein said gear means comprises a pinion gear on said rotor shaft and rack teeth on said control shaft, said torsion wire acting to hold the teeth of said pinion gear against said rack teeth and also acting to hold said control shaft against said bearing surfaces.

9. The combination of claim 6, wherein said turret is provided with means defining a series of detent shoulders, and a detent wire spring in engagement with said main housing at spaced points thereon and having a V-shaped portion which is resiliently biased into engagement with an adjacent pair of said shoulders, thereby to provide a series of fixed detent positions for said turret.

10. The combination of claim 9, which includes a switch having a pair of normally open contacts, and means interconnecting the end of said detent spring and said switch so that said switch contacts are closed each time said V-shaped portion of said detent spring rides over one of said shoulders.

11. The combination of claim 9 wherein said detent wire spring is journaled in an adjustment bracket which is pivotally mounted on said main housing, movement of said bracket being effective to produce a slight rotational adjustment of said turret, and means for holding said bracket in an adjusted position.

12. The combination of claim 6, wherein each of said adjustable members is controlled by an adjustment screw extending radially outwardly from the rotational axis of said turret and having a gear on the outer end thereof, a selector shaft, means including gear means for interconnecting said selector shaft and said turret so that said turret is rotated in response to rotation of said selector shaft, and a gear connected to said selector shaft and movable into engagement with one of said adjustment screw gears in response to axial movement of said selector shaft.

13. The combination of claim 12, wherein a second control shaft is provided concentric with said selector shaft, said gear means comprises beveled gears on said second control shaft and said turret, and means interconnecting said second control shaft with said selector shaft for rotation thereof while permitting said selector shaft to be moved axially independently of said second control shaft.

14. The combination of claim 13, wherein said interconnecting means comprises a transverse pin on said selector shaft and a series of slots in the end of said second control shaft which are individually adapted to receive said pin.

15. The combination of claim 12, wherein said turret is provided with a series of interlocking means, and means carried by said selector shaft and movable into interlocking relation with one of said interlocking means when said gear is moved into engagement with one of said adjustment screw gears, thereby to prevent said turret from rotating while said one adjustment screw gear is being driven from said gear.

16. The combination of claim 6, wherein each of said adjustable members is controlled by an adjustment screw extending radially outwardly from the rotational axis of said turret and having a gear on the outer end thereof, a selector shaft normally biased to a forward position, a driving gear on said selector shaft and movable into engagement with one of said adjustment screw gears in response to rearward movement of said selector shaft, a switch having a pair of normally open contacts, and means interconnecting said selector shaft and said switch and operative to close said switch contacts in response to said rearward movement of said selector shaft.

17. The combination of claim 6, wherein each of said adjustable members is controlled by an adjustment screw extending radially outwardly from the rotational axis of said turret and having a gear on the outer end thereof, a selector shaft normally biased to a forward position, a driving gear on said selector shaft and movable into engagement with one of said adjustment screw gears in response to rearward movement of said selector shaft, means for journalling the forward end of said selector shaft in said main housing, a flat spring having one end secured to said main housing, means defining a conical shoulder on the rear end of said selector shaft, and an eyelet positioned in the free end of said flat spring and urged into engagement with said conical shoulder, thereby to support the rear end of said selector shaft while permitting the same to be moved rearwardly.

18. The combination of claim 17, wherein said flat spring is adjustably mounted so that the rear end of said selector shaft may be positioned for proper engagement of said driving gear with said one adjustment screw gear.

19. The combination of claim 6, wherein there is provided a series of indicator lamps, individually corresponding to said adjustable members, a source of power, and switch means controlled in response to rotation of said turret for selectively connecting said source to different ones of said indicator lamps in accordance with the particular one of said adjustable members which is in engagement with said follower element.

20. The combination of claim 19, wherein there is provided a scale having indicia corresponding to stations in the UHF band, and pointer means cooperating with said scale and connected to said control shaft for indicating the UHF channel to which each of said adjustable members is set.

21. In a UHF tuner, the combination of, a conductive housing having a pair of opposed walls, a conductive rotor shaft rotatably mounted in said opposed walls and having a plurality of tuning elements thereon, a plurality of fixed tuning elements positioned within said housing and cooperating with said tuning elements on said rotor shaft, means defining a passageway in said rotor shaft extending longitudinally thereof, an elongated member positioned within said passageway, means connecting a first portion of said member to said rotor shaft so that said first portion rotates with said rotor shaft, and means connecting a second portion of said member which is spaced from said first portion thereof to a fixed point, whereby the intermediate portion of said member between said first and second portion is twisted as said rotor shaft is rotated and exerts a torque thereon tending to resist said rotation.

22. In a UHF tuning mechanism, the combination of, a base member, a turret rotatably mounted on said base member and having a plurality of independently adjustable members mounted thereon, a UHF tuner housing mounted on said base member, said UHF tuner housing having a pair of opposed walls, a conductive rotor shaft rotatably mounted in said opposed walls, said UHF tuner housing having another wall between said rotor shaft and said turret, an opening in said another wall, a control member positioned in said opening and extending perpendicularly to said rotor shaft, gear means interconnecting said control member and said rotor shaft within said UHF tuner housing, a follower element connected to said control member outside said UHF tuner housing and adapted to be engaged by different ones of said adjustable members as said turret is rotated, and means for resiliently biasing said follower element into engagement with one of said adjustable members.

23. The combination of claim 22, wherein said turret is provided with means defining a series of detent shoulders, a generally U-shaped detent wire spring having an intermediate portion extending parallel to the axis of rotation of said turret, means for supporting said intermediate portion adjacent the ends thereof in such manner as to permit twisting thereof, and means carried on one right angle end portion of said detent spring for engagement with an adjacent pair of said detent shoulders, thereby to provide a series of fixed detent positions for said turret.

24. The combination of claim 22, wherein each of said adjustable members is controlled by an adjustment screw having a gear on one end thereof.

* * * * *